April 18, 1944.   R. H. PACKARD   2,346,864
ANEMOMETER
Filed Dec. 2, 1941
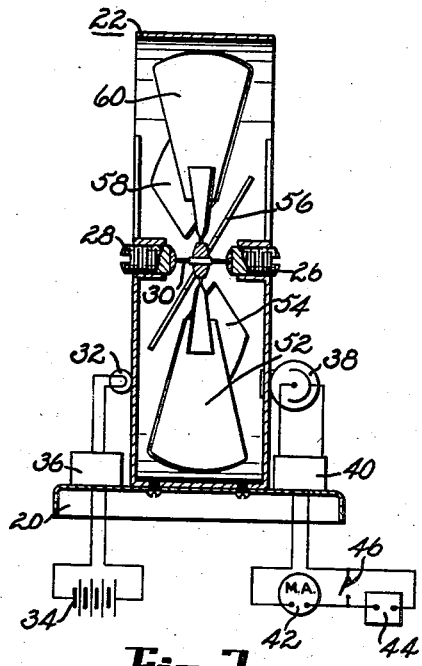
Fig.2
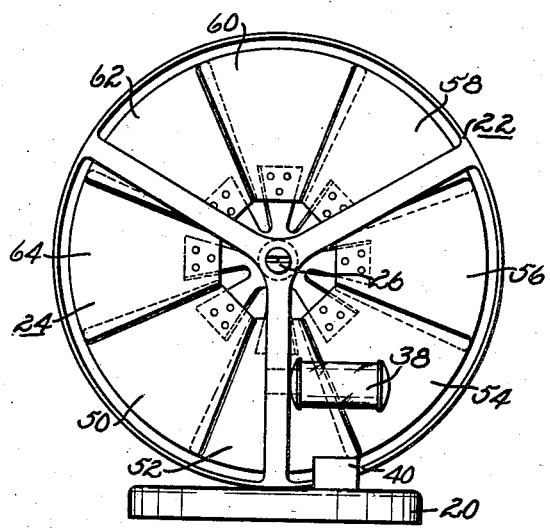
Fig.1
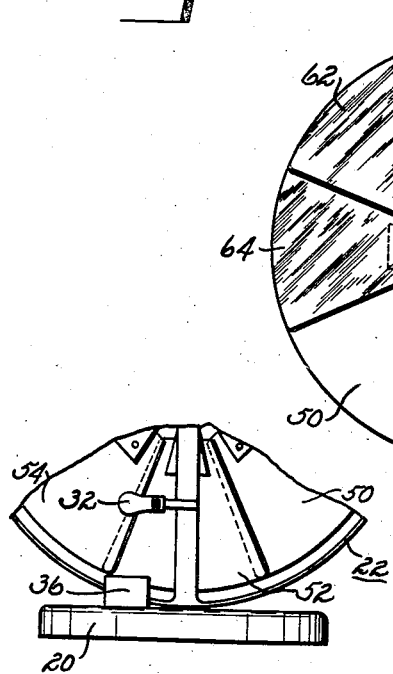
Fig.3
Fig.4
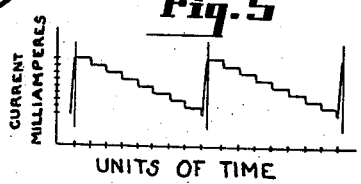
Fig.5
INVENTOR.
Robert Henry Packard
BY Spencer Hardman and Fehr
Attorneys Patented Apr. 18, 1944

2,346,864

UNITED STATES PATENT OFFICE 2,346,864

ANEMOMETER

Robert Henry Packard, Newton, Mass., assignor, by mesne assignments, to General Motors Corporation, Dayton, Ohio, a corporation of Delaware Application December 2, 1941, Serial No. 421,379

2 Claims. (Cl. 73—229)

This invention relates to anemometers and more particularly to anemometers capable of accurately measuring low air velocities.

Anemometers are notoriously inaccurate. It is difficult to provide an accurate anemometer. This is probably due to the friction losses in the mechanism and to air slippage upon the air contact member. In anemometers, it is customary to use an air driven rotor to drive a mechanical counter. Such a counter, however, constitutes the principal source of friction and provides a drag upon the air contacting blades causing air slippage on the air contacting blades. This accounts for the principal inaccuracy in anemometers.

It is an object of my invention to provide an anemometer which is particularly accurate at low air velocities.

It is another object of my invention to provide an anemometer in which the friction and air slippage are substantially eliminated.

It is still another object of my invention to provide an anemometer in which the indicating mechanism is not dependent upon the air contacting member for power.

In order to attain these objects I have provided a freely rotatable bladed air driven rotor or windwheel mounted upon substantially frictionless bearings. A source of light and a photoelectric cell are placed on opposite sides of the rotor so that the blades will intercept the light rays transmitted from the light source to the cell. The photoelectric cell controls an electric current which varies in accordance with the rotation of the rotor. The variations of this electric current are used to determine the velocity of the air.

Further objects and advantages of the present invention will be apparent from the following description, reference being had to the accompanying drawing, wherein a preferred form of the present invention is clearly shown.

In the drawing:

Fig. 1 is a view in elevation disclosing one form of my invention;

Fig. 2 is a vertical sectional view of Fig. 1;

Fig. 3 is a view of the rotor blades;

Fig. 4 is a fragmentary view showing the location of the light source; and

Fig. 5 is a graph of the amplified current controlled by the photoelectric cell.

Referring now to the drawing, there is shown a base 20 to which is fastened a rotor cage 22 comprising a wide ring of metal surrounding and concentric with an eight-bladed lightweight rotor or windwheel 24. Each side of the cage is provided with three thin converging arms which at the central point are provided with adjustable set-screws 26 and 28. These set-screws 26 and 28 at their inner end support the jeweled bearings for shaft 30 of the rotor 24. Supported by the vertical arm on one side of the cage 22 is an incandescent light 32 which is supplied with electric energy from a suitable power source 34, under the control of an accurate voltage control device indicated diagrammatically as 36. The vertical arm on the opposite side supports a small photoelectric cell 38 which is connected to an amplifier 40. The amplified current from the photoelectric cell is conducted to a milliammeter 42. An electrical counter 44 may also be connected into the circuit by opening the switch 46.

The rotor is preferably made of blades having a progressively varying amount of opacity. The blades overlap slightly so that there will not be any unobstructed passage of light between the blades. In the preferred form, I propose to make the blade 50 transparent. This blade may be made of some suitable material such as mica, or of a cellulose nitrate or acetate product. The next blade 52 may be lightly coated, as indicated by the shading in Fig. 3, while a blade 54 is somewhat more heavily coated. The blades 56, 58, 60 and 62 are progressively positioned in a counter-clockwise direction and are provided with more opaque coating in accordance with their respective positions. The remaining blade 64 may be made substantially completely opaque. If desired, the opacity of each of the blades may increase progressively from one edge to the other in a counter-clockwise direction. However, it is obvious that various arrangements might be used for various purposes. For example, the blades might be made of different colors. Obviously it is merely necessary to provide something which is rotated or moved in accordance with the rotation of the rotor to vary the transmission of light from the light bulb 32 to the photoelectric cell 38. It is also clear that many schemes could be used for various purposes.

The varying of the transmission of light by the blades from the light 32 to the photoelectric cell 38 will cause a variation in the current supplied to the milliammeter such as is illustrated in Fig. 5. There will be a corresponding deflection of the meter of the milliammeter 42 in accordance with the rotation of the rotor. That is, the needle of the milliammeter will show the greatest deflection when the blade 50 is in alignment between the light 32 and the photoelectric cell 38. A progressively decreasing current as illustrated in Fig. 5 will flow as the rotor rotates in a clockwise direction, as viewed in Fig. 3. The needle of the milliammeter 42 will fall to some fixed point when the blade 64 is in alignment, but when the blade 50 again passes into alignment the milliammeter will be again deflected the greatest amount.

Each of the steps in the graph (Fig. 5) indicate one-eighth of a revolution of the rotor. The indicator of the milliammeter will be deflected accordingly. When the rotor 24 revolves slowly, each one-eighth of a revolution may be counted and compared with the elapsed time. By counting the number of such deflections per unit of time the rate of air velocity in one-eights of a revolution of the rotor can be accurately determined. The graph (Fig. 5) shows two current cycles representing two typical revolutions of the rotor. By opening the switch 46, the current flowing through the milliammeter 42 is also caused to flow through an electrical counter 44 which will count each of the cycles of current-flow through the milliammeter and thus will count each revolution of the rotor. If the rotor rotates in the opposite direction the step pattern of current-flow will be reversed so that this anemometer will measure fluctuating air currents and at the same time will indicate the direction of flow.

It will be seen that the air to be measured may freely flow through the rotor cage 22 and no friction is imposed upon the rotor, excepting the practical negligible friction of the jeweled bearings. The rotor may be made very light in weight since it is not required to drive any counting mechanism and this makes the rotor very sensitive to air flow.

While the form of embodiment of the invention as herein disclosed, constitutes a preferred form, it is to be understood that other forms might be adopted, all coming within the scope of the claims.

What is claimed is as follows:

1. An anemometer comprising a rotatable windwheel having a plurality of blades, a source of light located on one side of the windwheel, a photoelectric cell located on the other side of the windwheel in alignment with the blades and the source so that the blades pass between the source and the cell as the windwheel rotates, said blades having different degrees of translucency to permit the flow of light from said source to said cell in accordance with the movement of the blades, and means controlled by the cell for indicating the movement of the blades.

2. An anemometer comprising an air-driven rotor having a plurality of blades, a source of radiant energy and a photoelectric cell positioned on opposite sides of the blades, the blades being differently composed to allow different amounts of radiant energy to pass from the source to the cell, and means controlled by the cell for indicating the parts of each revolution of the rotor.

ROBERT HENRY PACKARD.